UNITED STATES PATENT OFFICE.

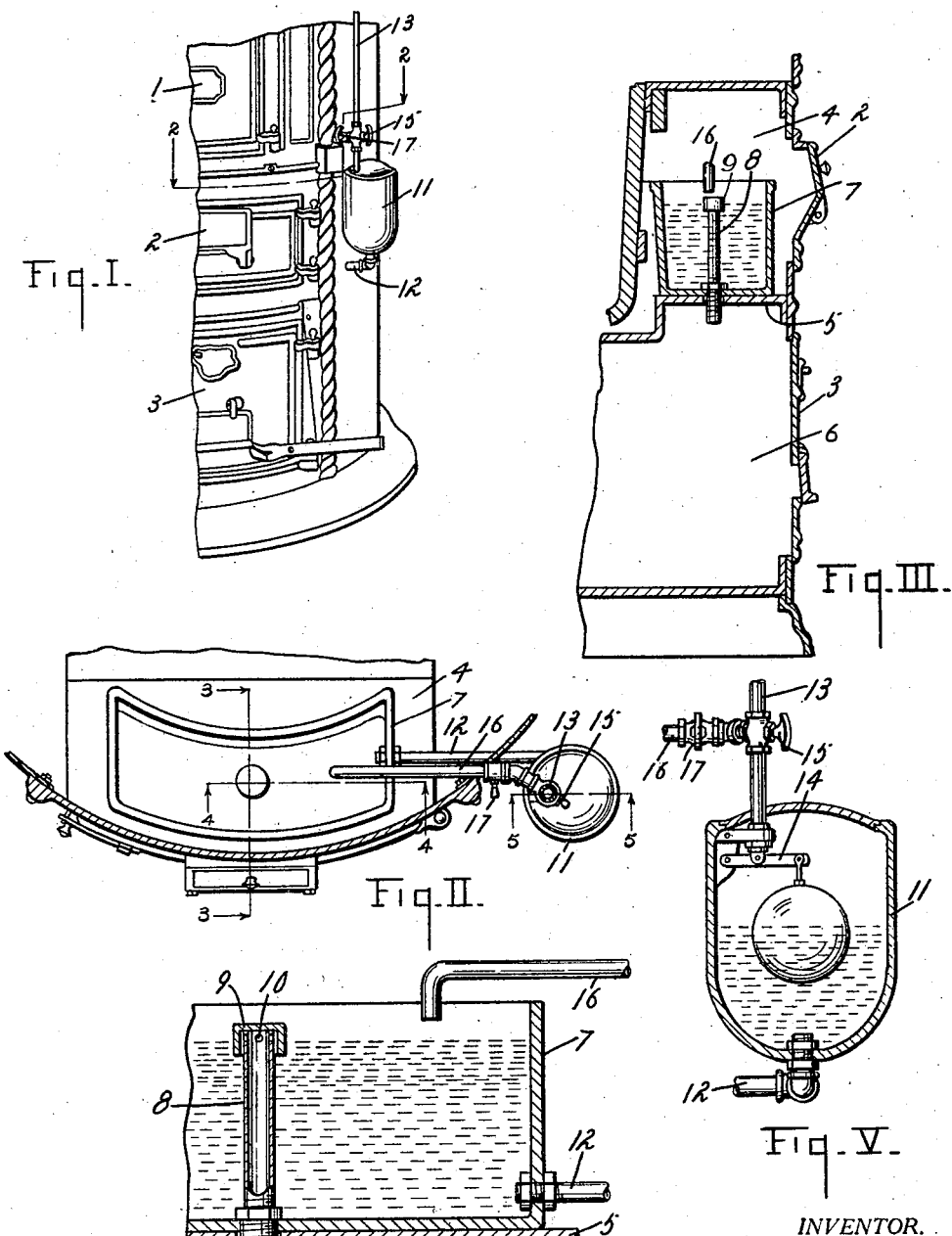

GEORGE W. HOWES, OF DOWAGIAC, MICHIGAN, ASSIGNOR TO THE BECKWITH COMPANY, OF DOWAGIAC, MICHIGAN.

HUMIDIFIER FOR HOT-AIR FURNACES.

1,238,771. Specification of Letters Patent. Patented Sept. 4, 1917.

Application filed March 7, 1917. Serial No. 153,042.

*To all whom it may concern:*

Be it known that I, GEORGE W. HOWES, a citizen of the United States, residing at Dowagiac, county of Cass, State of Michigan, have invented certain new and useful Improvements in Humidifiers for Hot-Air Furnaces, of which the following is a specification.

This invention relates to humidifiers for hot air furnaces.

The object of the invention is to provide improved means for automatically maintaining the water in the water pan of a furnace of this type at a constant level and for flooding the ash pan to moisten the ashes.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a detail front elevation of a furnace provided with my improvements.

Fig. II is an enlarged detail section taken on a line corresponding to the broken line 2—2 of Fig. I.

Fig. III is an enlarged detail section taken on a line corresponding to line 3—3 of Fig. II.

Fig. IV is an enlarged detail section taken on a line corresponding to line 4—4 of Fig. II.

Fig. V is an enlarged detail section taken on a line corresponding to line 5—5 of Fig. II.

In the drawings similar reference characters refer to similar parts throughout the several views and the sectional views are taken looking in the direction of the little arrows at the ends of the section lines.

The drawings illustrate a furnace comprising a fire door 1, a water pan door 2 and an ash pit door 3. Mounted within the air chamber 4 upon the top wall 5 of the ash pit 6 is the water pan 7. An overflow pipe 8 extends through the bottom of the water pan 7 and the wall 5 whereby it is adapted to discharge water into the ash pit 6. The top of the overflow pipe 8 is provided with a cap 9, the side flange of which is slightly spaced from the outer side of the pipe in order to provide a water passage therebetween, and a plurality of holes 10 are formed adjacent the upper end of the overflow pipe. The cap 9 constitutes, in connection with the water in the water pan 7, a water seal which prevents the dust and gases from the ash pit from finding access to the air chamber 4.

The means for maintaining the water in the water pan 7 at a constant level comprises a constant level of float chamber 11 which is connected with the water pan by means of a pipe 12. Water is supplied to the chamber 11 by means of a pipe 13. A ball float valve mechanism, designated generally by the numeral 14, is mounted in the chamber 11 to coöperate with the supply pipe 13 to maintain a practically constant level in the chamber 11 and consequently in the pan 7. A valve 15 in the pipe 13 provides means whereby the supply of water to the chamber 11 may be cut off or established. A branch pipe 16 is tapped off from the casing of the valve 15, extends through the outer casing of the furnace and discharges into the water pan 7. A valve 17 in the pipe 16 provides means for controlling the flow of water therethrough.

When it is desired to flood the ash pan, it is merely necessary to turn the valve 17 to allow water to pass through the pipe 16 and into the water pan 7, whereupon it overflows through the pipe 8 into the ash pit. The pipe 8 also acts as an overflow in case of disarrangement of the valve 14 or in case it should fail to entirely cut off the supply of water to the chamber 11. Water may be supplied to the ash pit before the grate is shaken so that the ashes are quickly moistened or it may be supplied after the grate is shaken, in which case more time is required for the ashes to become moistened. I find it to be of practical advantage to maintain a quantity of water in the ash pan.

Having thus described my invention, what I claim as new and desire to secure by Letters Patent is:

1. In a structure of the class described, the combination with a hot air furnace comprising an air chamber, a water pan mounted therein and an ash pit, of means automatically supplying water to said water pan and maintaining it at a substantially constant level, means for supplying water to said water pan independently of said automatic means, manually operable means for controlling the flow of water to said last named supply means, an overflow pipe connecting said water pan with said ash pit, and means for preventing gases and dust from escaping from said ash pit through said overflow pipe into said air chamber, substantially as described.

2. In a structure of the class described, the combination with a hot air furnace comprising an air chamber, a water pan mounted therein and an ash pit, of means automatically supplying water to said water pan and maintaining it at a substantially constant level, an overflow pipe connecting said water pan with said ash pit, and means for preventing gases and dust from escaping from said ash pit through said overflow pipe into said air chamber, substantially as described.

In witness whereof, I have hereunto set my hand and seal in the presence of two witnesses.

GEORGE W. HOWES. [L. S.]

Witnesses:
H. W. PALMER,
HARRY C. MOSHER.

Copies of this patent may be obtained for five cents each, by addressing the "Commissioner of Patents, Washington, D. C."